United States Patent
Kumon et al.

(10) Patent No.: US 6,741,204 B2
(45) Date of Patent: May 25, 2004

(54) SIGNAL PROCESS APPARATUS FOR AN ON-VEHICLE RADAR AND METHOD THEREOF

(75) Inventors: Hiroaki Kumon, Kariya (JP); Yukimasa Tamatsu, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/391,198

(22) Filed: Mar. 19, 2003

(65) Prior Publication Data

US 2003/0179130 A1 Sep. 25, 2003

(30) Foreign Application Priority Data

Mar. 19, 2002 (JP) .......................................... 2002-76469

(51) Int. Cl.$^7$ .............................................. G01S 13/93
(52) U.S. Cl. .......................... 342/70; 342/192; 342/196
(58) Field of Search .............................. 342/70, 71, 72, 342/192, 193, 194, 195, 196

(56) References Cited

U.S. PATENT DOCUMENTS

| | | | | |
|---|---|---|---|---|
| 5,563,602 A | * | 10/1996 | Stove | 342/70 |
| 6,369,700 B1 | * | 4/2002 | Yamada | 340/435 |
| 6,577,269 B2 | * | 6/2003 | Woodington et al. | 342/196 |
| 2002/0075178 A1 | * | 6/2002 | Woodington et al. | 342/27 |
| 2003/0001772 A1 | * | 1/2003 | Woodington et al. | 342/70 |
| 2003/0179129 A1 | * | 9/2003 | Tamatsu et al. | 342/70 |

OTHER PUBLICATIONS

"Multiple sensor collision avoidance system for automotive applications using an IMM approach for obstacle tracking", Amditis, et al; Information Fusion, 2002. Procs. of the Fifth Int'l Conf. on, vol.: 2, Jul. 8–11, 2002 Ps:812–817.*

New system–level simulation of noise spectra distortion in FM–CW autonomous cruise control radar >>, Laloue, A.; Nallatamby, J.-C.; Camiade, M.; Prigent, M.; Obregon, J.;Microwave Symposium Digest, 2001 IEEE MTT–S Int'l, vol.: 1, May 20–25, 2001 Ps:459–462.*

* cited by examiner

*Primary Examiner*—John B. Sotomayor
(74) *Attorney, Agent, or Firm*—Denso Corporation

(57) ABSTRACT

The invention provides a signal process apparatus for an on-vehicle radar and a method thereof that can reduce operation load and obtain a sufficient detection capability.

According to information on a detected object, the invention registers as peak data a frequency BIN contained in a frequency region around a prediction peak that is to be detected on a distance power spectrum. The invention predicts a running line on which a predetermined vehicle runs, obtains a power spectrum along the running line, and registers as peak data the peak of the power spectrum. Then, the invention averages the distance power spectrum obtained for each channel, registers as peak data the peak of the averaged distance power spectrum, and only with regard to the registered peak data (frequency BIN), seeks a directional power spectrum.

10 Claims, 12 Drawing Sheets

SIGNAL PROCESS APPARATUS FOR AN ON-VEHICLE RADAR AND METHOD THEREOF

BACKGROUND OF THE INVENTION

1. Field of the Invention

The invention relates to a signal process apparatus for an on-vehicle radar and a method thereof, by which a transmission signal and a reception signal are mixed to produce a beat signal and processing the beat signal enables an object reflecting the transmission signal to be detected.

2. Description of the Related Art

From the past, there has been provided a vehicle space control apparatus for a vehicle that can detect a preceding vehicle and keep proper a distance between the vehicles, and a vehicle space alarm apparatus for a vehicle that can notify a driver of the vehicle of the fact that a distance between the vehicle and another vehicle is shortened more than is considered to be safe. Those apparatus employ, as one of on-vehicle radars, a frequency modulated continuous wave (FMCW) radar (hereinbelow called a "FMCW radar") that uses a millimeter wave region.

The FMCW radar makes use of a radar wave that is modulated so that frequencies of the radar wave can increase or decrease linearly in the form of a triangle with respect to time. Based on a beat signal derived by mixing a transmission signal of the radar wave with a reception signal of the radar wave reflected by an object, the FMCW radar gets information on the object that reflects the radar wave.

Specifically, with respect to each of rising modulation time when the frequency of the radar wave increases and at falling modulation time when the frequency of the radar wave decreases, a frequency analysis process, such as the fast Fourier Transform (FFT), of the beat signal is performed to obtain a power spectrum of the beat signal for each modulation time and peaks of the power spectrum. The peaks derived from the power spectrum for the two modulation times are properly combined to produce a combined peak (hereinbelow called a "peak pair"), which can be applied to a well known calculation formula. The application establishes a distance and a relative speed of the object specified by the peak pair.

FIG. 1 is a diagram for illustrating how an on-vehicle radar in prior art has a problem. FIG. 1(a) is a case where there are roadside objects on the left front side of and a preceding vehicle in front of a predetermined vehicle. FIG. 1(b) is a case where there are two preceding vehicles running in parallel in front of a predetermined vehicle. FIG. 1(c) is a diagram for a power spectrum obtained for FIGS. 1(a) and 1(b) with respect to the frequency BIN (distance). The solid line shows a detected power and the dotted line shows a predetermined threshold for determining whether or not a detected peak should be extracted as a peak. When, as shown in FIG. 1(a), the preceding vehicle, after detected, proceeds to a region where there are the roadside objects, or when, as shown in FIG. 1(b), the preceding vehicle, after detected, runs in parallel with another vehicle, the FMCW radar detects a power spectrum as shown by the solid lines in FIG. 1(c), where a peak (represented by a chain line) based on the detected preceding vehicle is buried in the peaks for the roadside objects or the preceding vehicle, without being detected. Failure to detect a peak is a problem.

There is proposed a method of detecting a buried object. The method uses an array of antennas that receives a radar wave, which produces a phase difference. Using the phase difference in the array, digital beam forming (DBF) process is performed, by which the buried object is separated in a direction to be detected.

The DBF process is carried out specifically as described below. That is, from a power spectrum (called a "distance power spectrum" since frequencies correspond to distance) of a beat signal obtained for each antenna, signal components of the same frequency are extracted, respectively. The frequency analysis process, such as the FFT, of the extracted signal components are executed to get a power spectrum (called a "direction power spectrum" since frequencies correspond to direction). The process of getting the direction power spectrum is performed over an entire range (entire frequency BIN) of the distance power spectrum, which is classified for the same direction to form a beam.

However, since operation load for performing the beam formation is sufficiently large, high speed processors must be used to guarantee a speedy detection of the object. Accordingly, there is a problem that those high speed processors are expensive.

Moreover, Japanese Patent Application Laid-open No. 2001-228239 discloses a technique, by which the peaks of a distance power spectrum are extracted and performed only for the peaks is the operation of the direction power spectrum to reduce operation load.

However, the technique cannot derive a peak buried in another peak whose frequency is different in the distance power spectrum. Therefore, an object that produces the buried peak cannot be detected, which fails to provide a sufficient detection capability. This is also a problem.

As mentioned above, since the prior art gives rise to the problems, there is a need to resolve the problems.

SUMMARY OF THE INVENTION

The invention is directed to a signal process apparatus for an on-vehicle radar and a method thereof that satisfy the need. The invention reduces operation load and provides a sufficient detection capability.

One aspect of the invention involves a signal process apparatus for an on-vehicle radar having a plurality of channels formed by a transmission antenna and a reception antenna array, and for processing a beat signal derived by mixing a transmission signal of a radar wave transmitted by the transmission antenna with a reception signal received by reception antenna array the through the channels. The signal process apparatus comprises a first operation unit for performing frequency analysis of the beat signal and obtaining a distance power spectrum for each of the channels; a prediction point setting unit for setting a prediction point where an object is considered to be existent based on information other than peaks of the distance power spectrum; and a second operation unit for obtaining a direction power spectrum at the prediction point established by the prediction point setting unit based on a operation result of the first operation unit, whereby based on the operation result of the first and second operation units, information on the object that reflects the radar wave is obtained.

The signal process apparatus procures information concerning an object that reflects a radar wave, based on operation result by the first operation unit and the second operation unit.

The signal process apparatus for an on-vehicle radar can reduce operation load for detecting an object, since obtained is a direction power spectrum only on a prediction point where the object is considered to be existent, not a direction power spectrum on an entire region of a distance power spectrum obtained by the first operation unit.

Even when there is a peak buried in other peaks of different frequencies on a distance power spectrum, a signal process apparatus does not miss the buried peak to produce a high detection capability, since a prediction point is set based on information other than the distance power spectrum that is an operation result by the first operation unit.

Advantageously, the prediction point setting unit includes a running line estimator for estimating a running line that a predetermined vehicle is predicted to run, and a hidden peak extracting unit for obtaining a power spectrum along the running line that the running line estimator estimates and extracting a peak of the power spectrum, whereby a peak frequency that the hidden peak extracting unit extracts is set as the prediction point.

In the case, an object on a running line is detected preferentially, which is advantageous to an apparatus that controls a distance between a predetermined vehicle and a preceding vehicle (called a "vehicle distance" hereinbelow). Advantageously, the running line estimator estimates the running line based on at least one of outputs of a steering angle and a yaw rate sensor of the vehicle.

Advantageously, the running line estimator estimates the running line based on a shape of a road in front of the vehicle specified by an arrangement of stationary objects that has already been detected, and the running line estimator estimates the running line based on a shape of a road in front of the vehicle specified by map information and present position information on the vehicle provided from the outside.

Advantageously, the hidden peak extracting unit obtains a power at each point on the running line by the use of the Discrete Fourier Transform, when a power spectrum is obtained along a running line.

That is, when a power is obtained on each point along a running line, a power at unnecessary points is not calculated by the use of the FFT; instead, a power at necessary points is only calculated by the use of the DFT, which leads to a decrease in operation load.

Advantageously, the prediction point setting unit includes a peak predicting unit for predicting peaks that the detected objects is supposed to produce on the distance power spectrum, based on information obtained during a previous detection cycle on the detected objects, wherein the peak predicting unit establishes as the prediction point each frequency in a predetermined frequency range that contains peak frequencies to be predicted.

In the case, since a peak with respect to the detected object is detected preferentially, a newly produced peak can be differentiated without fail.

Advantageously, the apparatus comprises an extracting unit for extracting a peak, supposing that the peak on the detected objects is detected, when there is a possibility that the peak about the detected objects is buried in another peak by other objects on a directional power spectrum that the second operation unit obtains, with respect to the prediction point that the peak predicting unit has established.

The judgment as to whether or not there is a possibility that a peak is buried is carried out, for example, by the fact that there is a portion for a peak to be predicted whose power is beyond a predetermined threshold and that there is another portion in the vicinity that has more power.

Each constituent element in the signal process apparatus may be a program for performing a function of the constituent element.

In this case, the programs can be stored in a recording medium such as a floppy disc, a mini disk, a digital versatile disc, a compact disc-ROM, a hard disc, and a memory card that computer can read out. The stored programs, if need arise, may be loaded in a computer system to be used. In addition, the programs may be stored as a recording medium readable by a computer in a ROM and a backup RAM, which can be incorporated in a computer system. The programs not only in recording media but also from networks can be loaded for their use.

One aspect of the invention involves a method of processing a beat signal derived by mixing a transmission signal of a radar wave transmitted by a transmission antenna with a reception signal received by a reception antenna array through a plurality of channels in a signal process apparatus for an on-vehicle radar. The method comprises performing frequency analysis of the beat signal and obtaining a distance power spectrum for each of the channels; setting a prediction point where an object is considered to be existent based on information other than peaks of the distance power spectrum; and obtaining a direction power spectrum at the prediction point established by the prediction point setting unit based on a operation result of the first operation unit, whereby based on the operation result of the first and second operation units, information on the object that reflects the radar wave is obtained.

One aspect of the invention involves a method of processing a beat signal derived by mixing a transmission signal of a radar wave with a reception signal from a detected object in a signal process apparatus for an on-vehicle radar having a plurality of channels. The method comprises registering as peak data a frequency BIN contained in a frequency region around a prediction peak that is to be detected on a distance power spectrum, from information on the object; predicting a running line on which a predetermined vehicle runs to obtains a power spectrum along the running line; registering as peak data a peak of the power spectrum; obtaining a distance power spectrum for each channel; averaging the distance power spectrum; registering as peak data a peak of the averaged distance power spectrum; and seeking a directional power spectrum only with regard to the registered peak data.

BRIEF DESCRIPTION OF THE DRAWINGS

These and other features of the invention will now be described with reference to the drawings summarized below. These drawings and the associated description are provided to illustrate preferred embodiments of the invention, and not to limit the scope of the invention.

DETAILED DESCRIPTION OF THE PREFERRED EMBODIMENTS

Figure 1B:
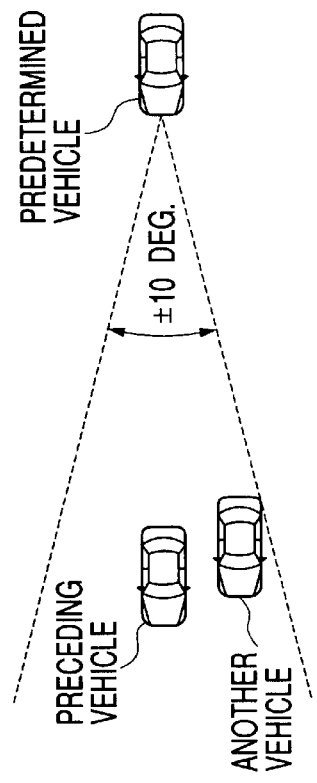
FIGS. 1a–c are diagrams for illustrating how an on-vehicle radar in prior art has a problem.
Figure 1A:
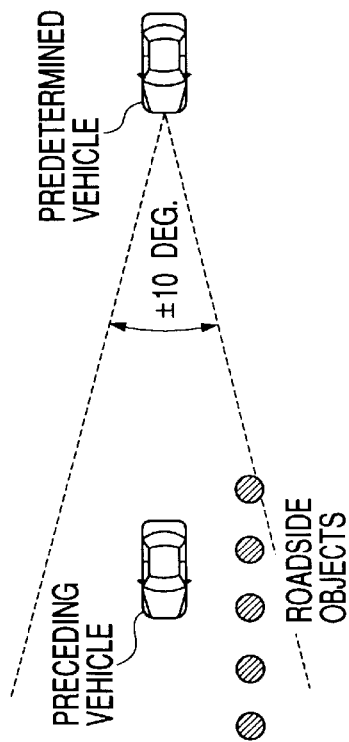
Figure 1C:
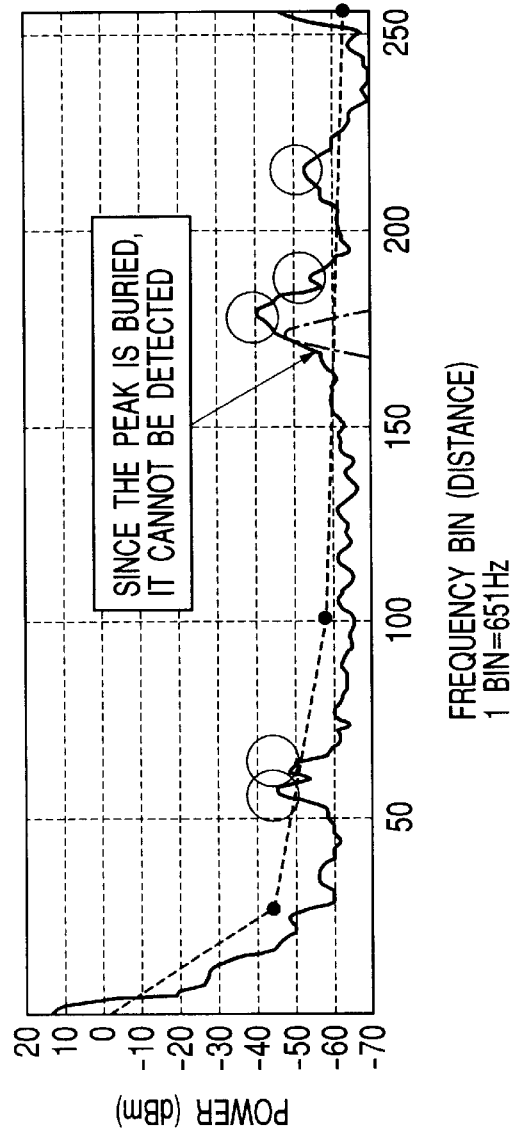
Figure 2:
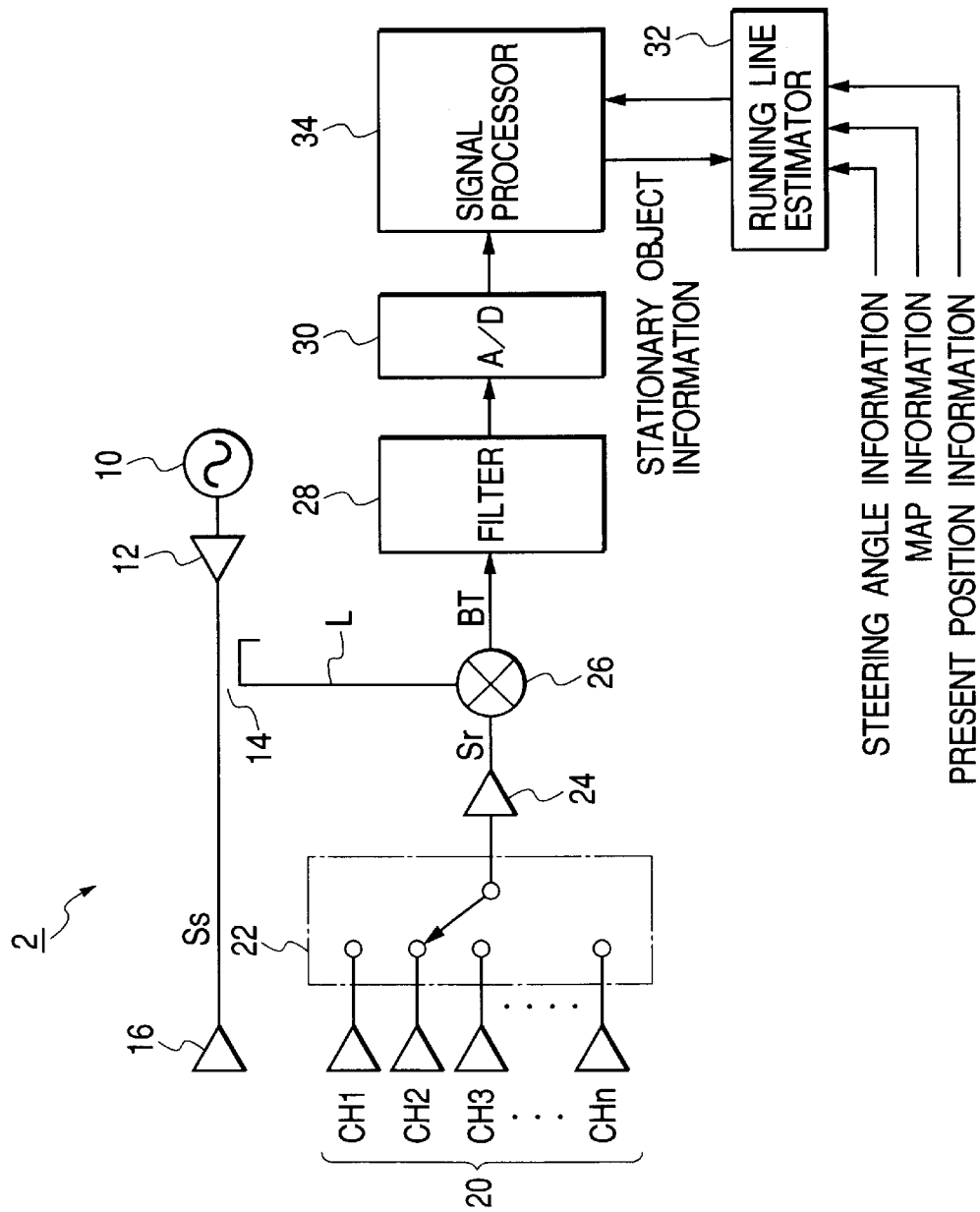
FIG. 2 is a block diagram for illustrating an entire structure for an on-vehicle radar in accordance with one embodiment of the invention.

FIG. 2 is a block diagram for illustrating an entire structure for an on-vehicle radar in accordance with one embodiment of the invention. Reference numeral 2 refers to an on-vehicle radar. The on-vehicle radar 2 includes an oscillator 10 that generates a high frequency signal of a millimeter wave region, in which frequencies with respect to time can be modulated to gradually increase or decrease linearly in a form of triangular waves; an amplifier 12, connected to the oscillator 10, that amplifies a high frequency signal applied by the oscillator 10; a distributor 14 that distributes an output of the amplifier 12 as a transmission signal Ss and a local signal L with respect to power; a transmission antenna 16 connected to the amplifier 12 for radiating a radar wave in accordance with the transmission signal Ss; and a reception antenna array 20 having n reception antennas that receives the radar wave.

In addition, the on-vehicle radar 2 includes a switch array 22 that in turn selects one of the antennas in the reception antenna array 20; an amplifier 24, connected to the switch array 22, that receives a reception signal Sr from the switch array 22 to amplify the signal; a mixer 26, connected to the amplifier 24, that mixes the reception signal Sr with the local signal L to produce a beat signal BT; a filter 28, connected to the mixer 26, that eliminates unnecessary portions of the beat signal BT; an analog to digital (A/D) converter 30, connected to the filter 28, that samples an output signal from the filter 28 to convert the output signal to digital data; a signal processor 34, connected to the A/D converter 30, that performs signal process of the sampled data of the beat signal BT from the A/D converter 30 and obtain a distance to an object which reflects the radar wave, a relative velocity, and a direction of the object; and a running line estimator 32, connected to the signal processor 34, that communicates data with the signal processor 34.

Each antenna of the reception antenna array 20 is designed so that a beam width (an angle range in which a gain drop with respect to a positive direction is below 3 dB) of each antenna can include all of a beam width (in one embodiment of the invention, ±10 degrees toward a traveling direction of the vehicle) of the transmission antenna 16. Each antenna is allotted CH1–CHn.

The running line estimator 32 receives as inputs steering angle information from a steering angle sensor, information from a yaw rate sensor, present position information of a predetermined vehicle from a navigation system, map information around the predetermined vehicle, and stationary object information (information on the objects that are detected and stationary) from the signal processor 34. Then, the running line estimator 32 estimates a running line based on a road shape specified by the present position information, the map information and the stationary object information, and a condition of the vehicle specified by the steering angle information and the information from the yaw rate sensor.

The signal processor 34 includes a microcomputer having CPUs, ROMs, and RAMs, and in addition, contains an operation process unit (for example, a digital signal processor (DSP)) that executes the Fast Fourier Transform (FFT) process and the Discrete Fourier Transform (DFT) process with respect to data from the A/D converter 30. Then, signal processor 34 performs process of obtaining a distance to an object, a relative speed and a direction of the object.

According to the on-vehicle radar 2 in accordance with one embodiment of the invention, a high frequency signal that the oscillator 10 generates and the amplifier amplifies is distributed in terms of power by the distributor 14, which produces the transmission signal Ss and the local signal L. The transmission signal Ss is then transmitted as a radar wave through the transmission antenna 16.

The radar wave (reflected wave) radiated by the transmission antenna 16 and reflected back by the object is received by all the antennas of the reception antenna array 20. However, only the reception signal Sr of the reception channel CHi (i=1–n) that the switch array 22 selects is amplified by the amplifier 24 to be applied to the mixer 26. The mixer mixes the reception signal Sr with the local signal L from the distributor 14, which generates the beat signal BT. The beat signal BT is filtered by the filter 28 to eliminate unnecessary components, which is followed by the A/D converter 30 to be sampled. Then the beat signal BT is fed to the signal processor 34.

The switch array 22 is switched so that all the channels CH1–CHn may be selected 2×Fmax times (Fmax=256 according to one embodiment of the invention), respectively, for one modulation period of the radar wave. The sampling in the A/D converter 30 is performed in synchronous with the switching timing. That is, during one modulation period of the radar wave, sampling data is stored by Fmax for each of the channels CH1–CHn and each of the modulation period of the radar wave.

Figure 3:
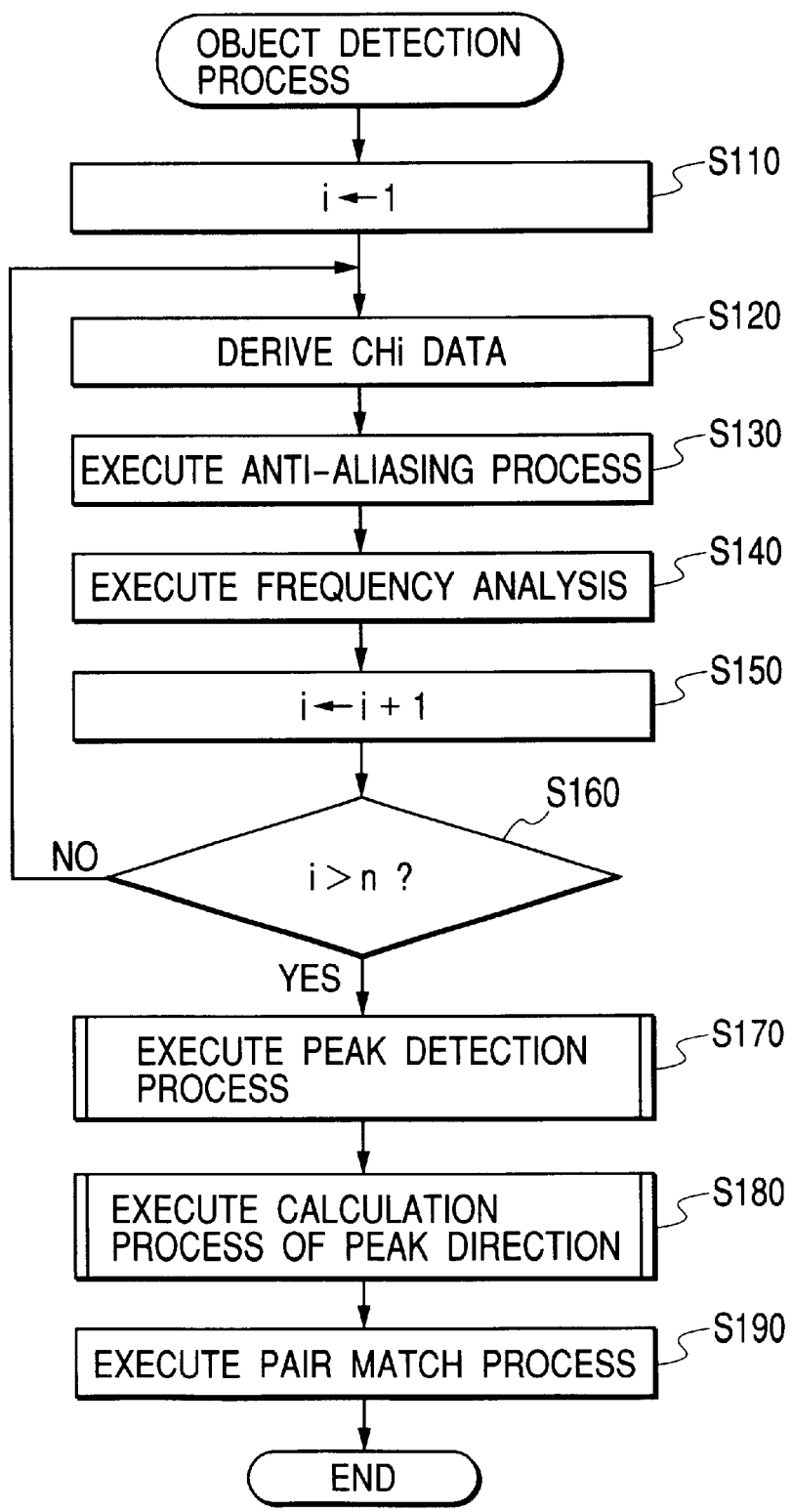
FIG. 3 is a flowchart of an object detection process program by a signal processor in accordance with one embodiment of the invention.

FIG. 3 is a flowchart of an object detection process program by a signal processor in accordance with one embodiment of the invention. The object detection process that the signal processor 34 executes repeatedly for each modulation period of the radar wave will be explained based on the flowchart shown in FIG. 3.

When the process starts up, a counter that shows a value i for distinguish the channels CH1–CHn is preset to 1 (step 110). Sampling data stored on the CHi is derived (step 120), which is followed by execution of an anti-aliasing process about the derived data (step 130). For each of rising modulation time of the first half of and falling modulation time of the second half of the modulation period of the radar wave, a frequency analysis (the FFT analysis according to one embodiment of the invention) about the data sampled is executed and a power spectrum of the beat signal on the CHi (called a "distance power spectrum" hereinbelow) is obtained for each of the modulation time (step 140). According to one embodiment of the invention, the distance power spectrum is obtained for a range of 0–166 kHz, and with respect to a frequency of BIN, one BIN corresponds to 651 Hz.

Then, the count value i is incremented (step 150), and it is judged whether or not the count value i is larger than the number n of the channels that the radar contains (step 150). When the count value i is not larger than the channel number n, the procedure returns to step 120, from which the same processes are executed for the unprocessed channel CHi.

On the other hand, when the count value i is larger than the channel number n, the process of obtaining a distance power spectrum about all the channels CH1–CHn is assumed to be complete, and from the distance power spectrum obtained for each of the channels and each of modulation time is executed a peak detection process that specifies a frequency of the signal component where the power has reached its peak (step 170).

In order to seek a direction from which the reflected wave, which generated the peak detected at the peak detection process, travels, a calculation process of peak direction is executed (step 180). When there is a plurality of peaks, a pair match process is executed that specifies peaks to be paired for both of the modulation time (step 190) to complete the procedure.

From the coupled peak pairs, information (a relative speed, a distance and a direction) concerning an object specified by the peak pairs is supposed to be procured.

The peak detection process carried out at step 170 will be explained in detail, referring to the flowcharts shown in FIGS. 4–10.

Figure 4:
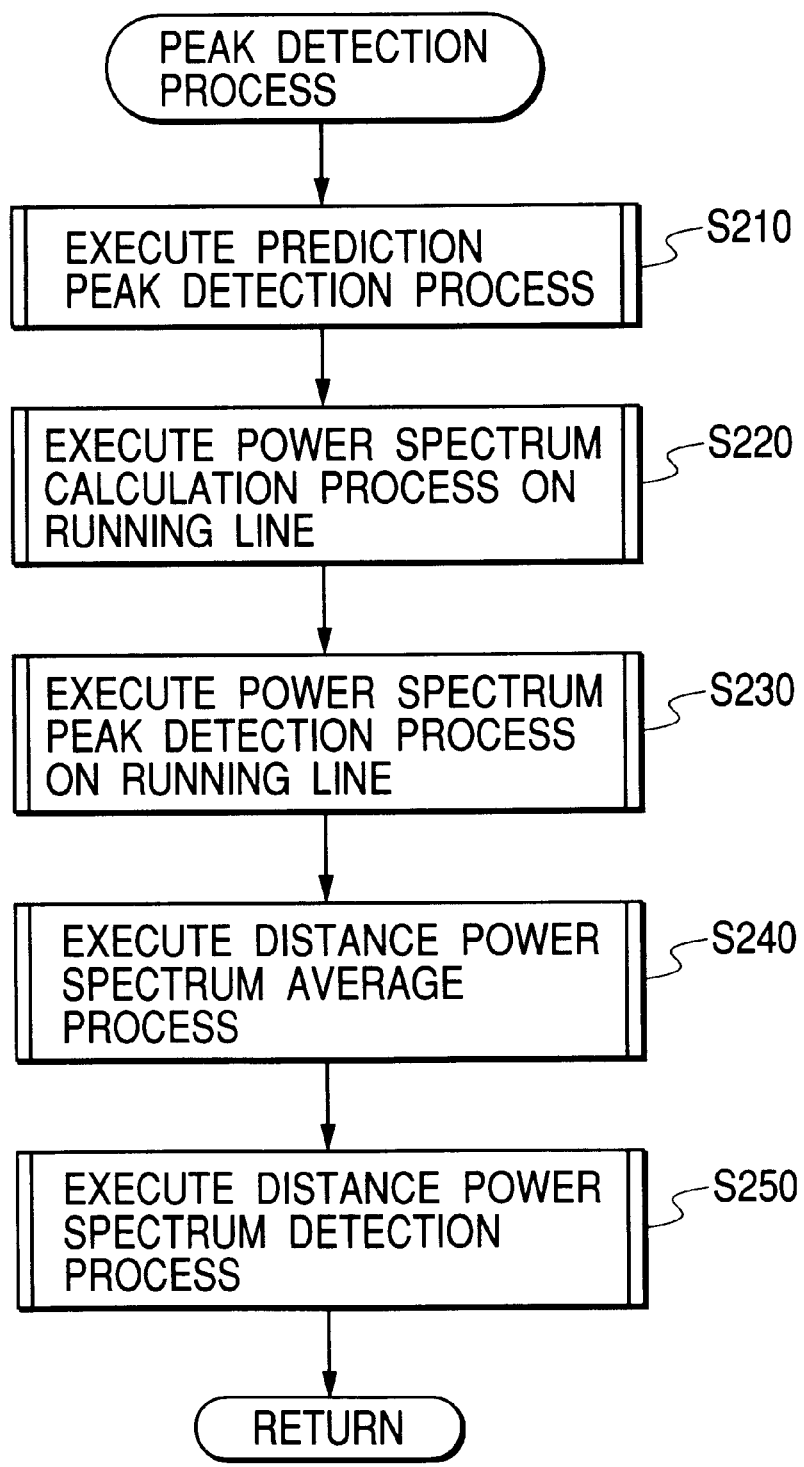
FIG. 4 is a flowchart of a peak detection process program in accordance with one embodiment of the invention.

FIG. 4 is a flowchart of the peak detection process program in accordance with one embodiment of the invention. A prediction peak detection process is executed (step 210) to detect peaks that correspond to the p objects Bj (j=1–p) detected during the previous detection cycle.

Figure 5:
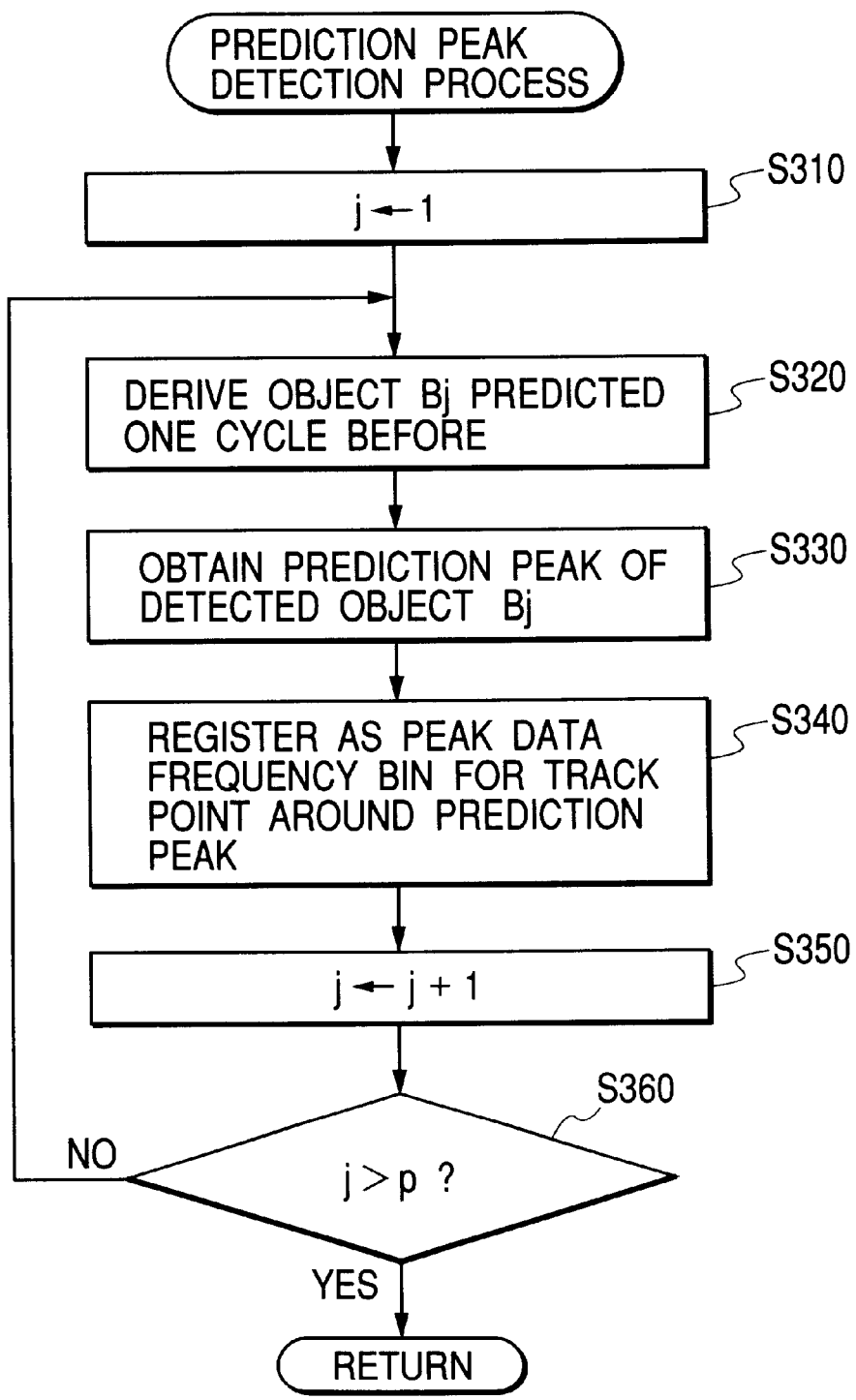
FIG. 5 is a flowchart of a prediction peak detection process program in accordance with one embodiment of the invention.

FIG. 5 is a flowchart of the prediction peak detection process program in accordance with one embodiment of the invention. A value 1 is preset in a counter that shows a value j to distinguish the detected objects B1–Bp (step 310). The information (a relative speed, a distance and a direction) regarding the detected object Bj is derived (step 320). Based on the derived information, a position and a relative speed that the detected object Bj will take for a present detection cycle is predicted, by which a prediction frequency at a peak to be detected on the distance power spectrum is obtained (step 330). When the relative speed is zero, the prediction frequencies are the same at both of the modulation time. When, however, the relative speed is not zero, the prediction frequencies are different at each of the modulation time, and should accordingly be procured for each of the modulation time.

At each of the modulation time, a frequency BIN for track points (for example, nine that corresponds to a range of approximately 4.5 m according to one embodiment of the invention) around the prediction frequency procured is registered as peak data (prediction points) (step 340).

After that, the count value j is incremented (step 350), which is followed by judgment as to whether or not the count value j is larger than the total number p of the detected objects (step 360). If the count value j is not larger than the total number p, the procedure returns to step 320, from which the same process is performed concerning the unprocessed detected objects Bj.

On the other hand, if the count value j is larger than the total number p, a process of registering peak data about all of the detected objects B1–Bp is judged to be complete, and the process ends.

When the prediction peak detection process is complete, the next step is to execute a process of calculating a power spectrum on a running line (step 220).

Figure 6:
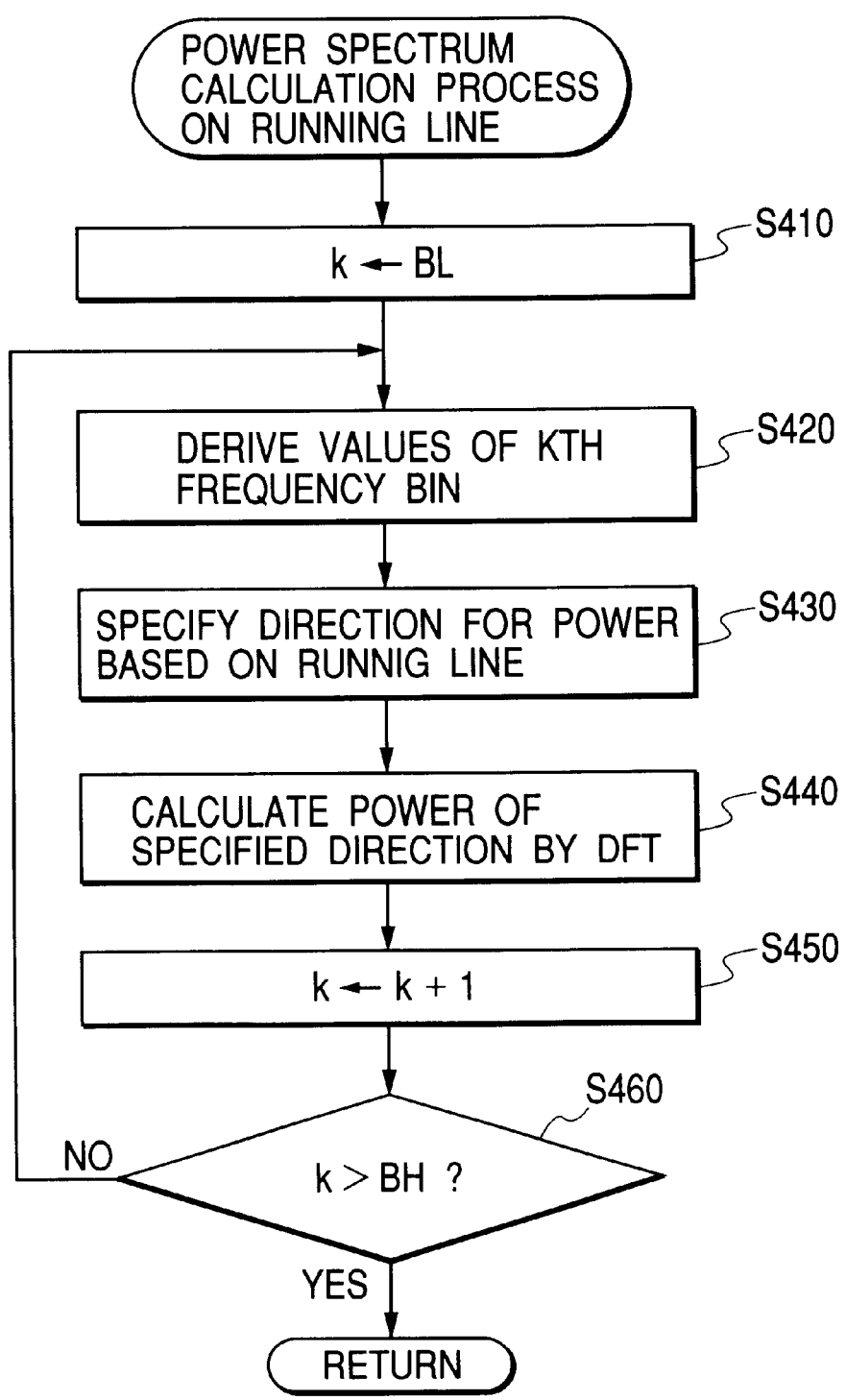
FIG. 6 is a flowchart of a power spectrum calculation process program on a running line in accordance with one embodiment of the invention.

FIG. 6 is a flowchart of the power spectrum calculation process program on a running line in accordance with one embodiment of the invention. A value k to distinguish a frequency BIN (0–Fmax–1) of the distance power spectrum is preset in a counter as a lower limitation value BL (30 in one embodiment of the invention) of a predetermined hidden peak detection range (step 410). From the distance power spectrum of all the channels CH1–CHn for each of the modulation periods, all of the values of the kth frequency BIN are derived (step 420). Then, based on the information regarding the running line derived from the running line estimator 32, it is specified in which direction (an angle with respect to a traveling direction of a vehicle) a point exists away from the present position by a distance corresponding to the kth frequency BIN on the running line (step 430). The power in the specified direction is calculated by the DFT using the values derived at step 420 (step 440).

Then, the count value k is incremented (step 450), and it is judged whether or not the count value k is larger than a predetermined upper limitation value BH in a hidden peak detection range (step 460). When the count value k is not larger than the upper limitation value BH (150 in one embodiment of the invention), the procedure returns to step 420, from which the same process is carried out with respect to the unprocessed frequency BIN.

If, on the contrary, the count value k is larger than the upper limitation value BH, the present process ends as the process of obtaining power on the running line is complete in terms of all of the frequency BINs in the region of the hidden peak detection.

When the direction calculated at step 430 is out of the range (a large angle) that the DFT can calculate, the present process ends immediately at the instance. The process of the frequency BIN registered as peak data is not performed at step 210.

After the power spectrum on the running line is calculated in this way, a peak detection process of the power spectrum on the running line is executed (step 230).

Figure 7:
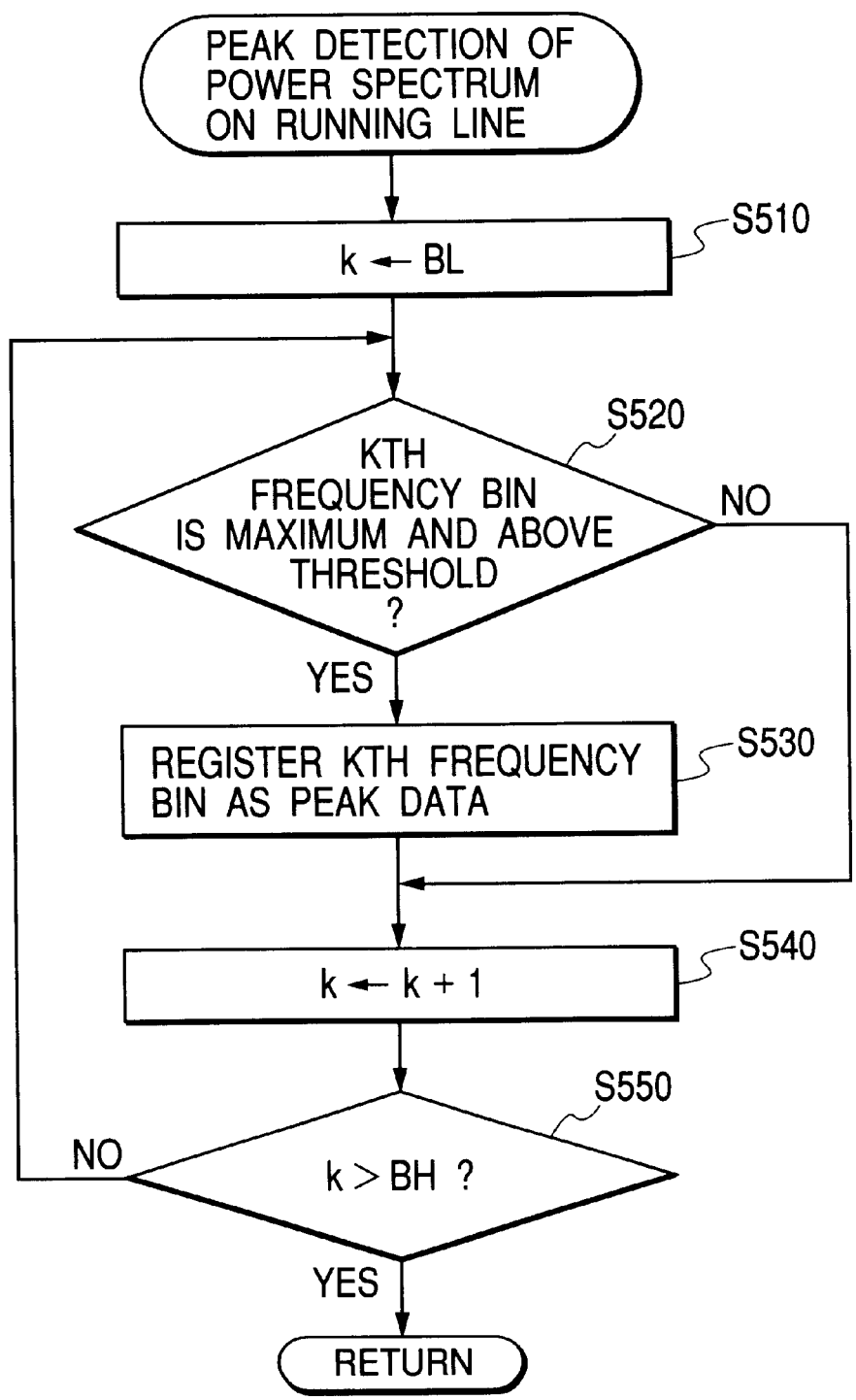
FIG. 7 is a flowchart of a peak detection process program of a power spectrum on a running line in accordance with one embodiment of the invention.

FIG. 7 is a flowchart of the peak detection process program of a power spectrum on a running line in accordance with one embodiment of the invention. The lower limitation value BL in the hidden peak detection range is preset for the value k in a counter to distinguish the frequency BIN of the power spectrum on the running line (step 510). It is judged whether or not the value (power) at the kth frequency BIN is at its maximum and above a predetermined threshold on the power spectrum (step 520). Only when it is affirmative, the kth frequency BIN is registered as peak data (prediction point) (step 530).

Then, the count value k is incremented (step 540), followed by a step where it is judged whether or not the count value k is larger than the upper limitation value BH in the hidden peak detection range (step 550). When the count value k is not larger than the upper limitation value BH, the procedure returns to step 520, from which the same process is carried out with respect to the unprocessed frequency BIN.

If, on the contrary, the count value k is larger than the upper limitation value BH, the present process ends as the process in terms of all of the frequency BINs in the region of the hidden peak detection is complete.

After all of the peaks concerning the power spectrum on the running line are detected in this way, an averaging process of a distance power spectrum for each of the channels CH1–CHn is executed (step 240).

Figure 8:
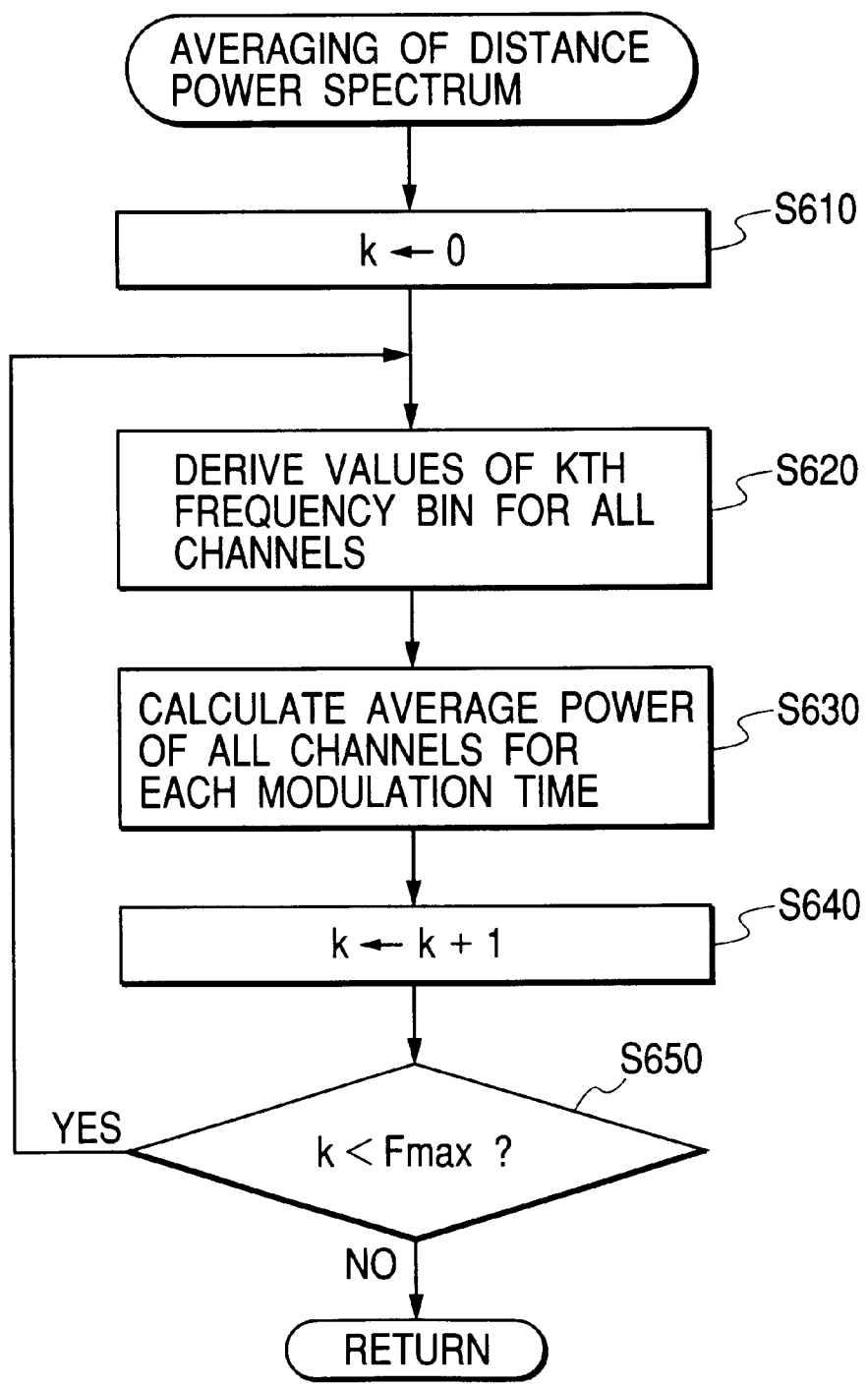
FIG. 8 is a flowchart of an averaging process program of a distance power spectrum in accordance with one embodiment of the invention.

FIG. 8 is a flowchart of the averaging process program of the distance power spectrum in accordance with one embodiment of the invention. The value k, which distinguishes the frequency BIN (0–Fmax–1) of the distance power spectrum, is preset in a counter as 0 (step 610). All of the values (power) of the kth frequency BIN are derived from the distance power spectrum for each of the modulation time of all the channels CH1–CHn (step 620). The average value (average power) is calculated for each of the modulation time to be stored (step 630).

Then, the count value k is incremented (step 640) to judge whether or not the count value k is smaller than a total number Fmax of the frequency BIN (step 650). If the count value k is smaller than the total number Fmax of the frequency BIN, the procedure returns to step 620, from which the same process is carried out with respect to the unprocessed frequency BIN.

If, on the contrary, the count value k is larger than the total number Fmax of the frequency BIN, the present process ends as the process in terms of all of the frequency BINs in the region of the hidden peak detection is complete. The calculation result at step 630 is called an average distance power spectrum hereinbelow.

After the average distance power spectrum is calculated, a process of detecting peaks on the average distance power spectrum is executed (step 250). Since the process at step 250 is the same as that at step 230 explained above, an explanation of the process at step 250 will be left out. However, at step 250 the process of the frequency BIN registered as peak data is not executed according to the processes of steps 210–230.

When all of the peaks are detected with respect to a synthesized distance power spectrum in this way, the peak detection process is complete (step 170).

That is, depending on the peak detection process, peaks predicted from the detected objects B1–Bp, peaks on the power spectrum on the running line, and frequency BINs corresponding to the peaks on the average distance power spectrum are supposed to be extracted as peak data.

Figure 9:
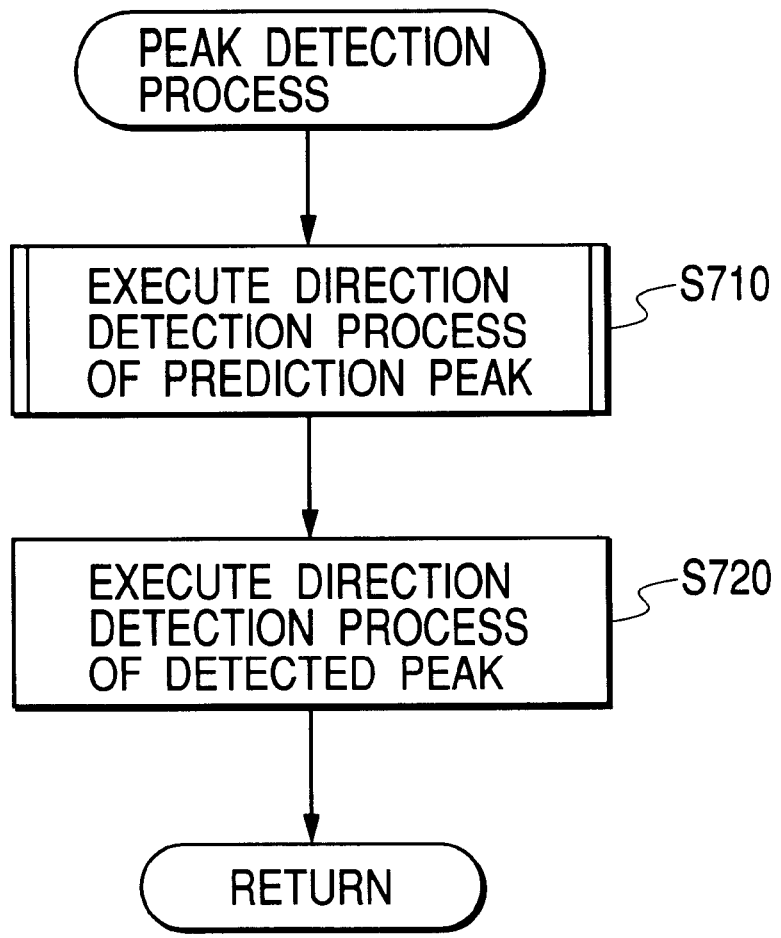
FIG. 9 is a flowchart of a peak direction detection process program in accordance with one embodiment of the invention.

FIG. 9 is a flowchart of a peak direction detection process program in accordance with one embodiment of the invention.

Figure 10:
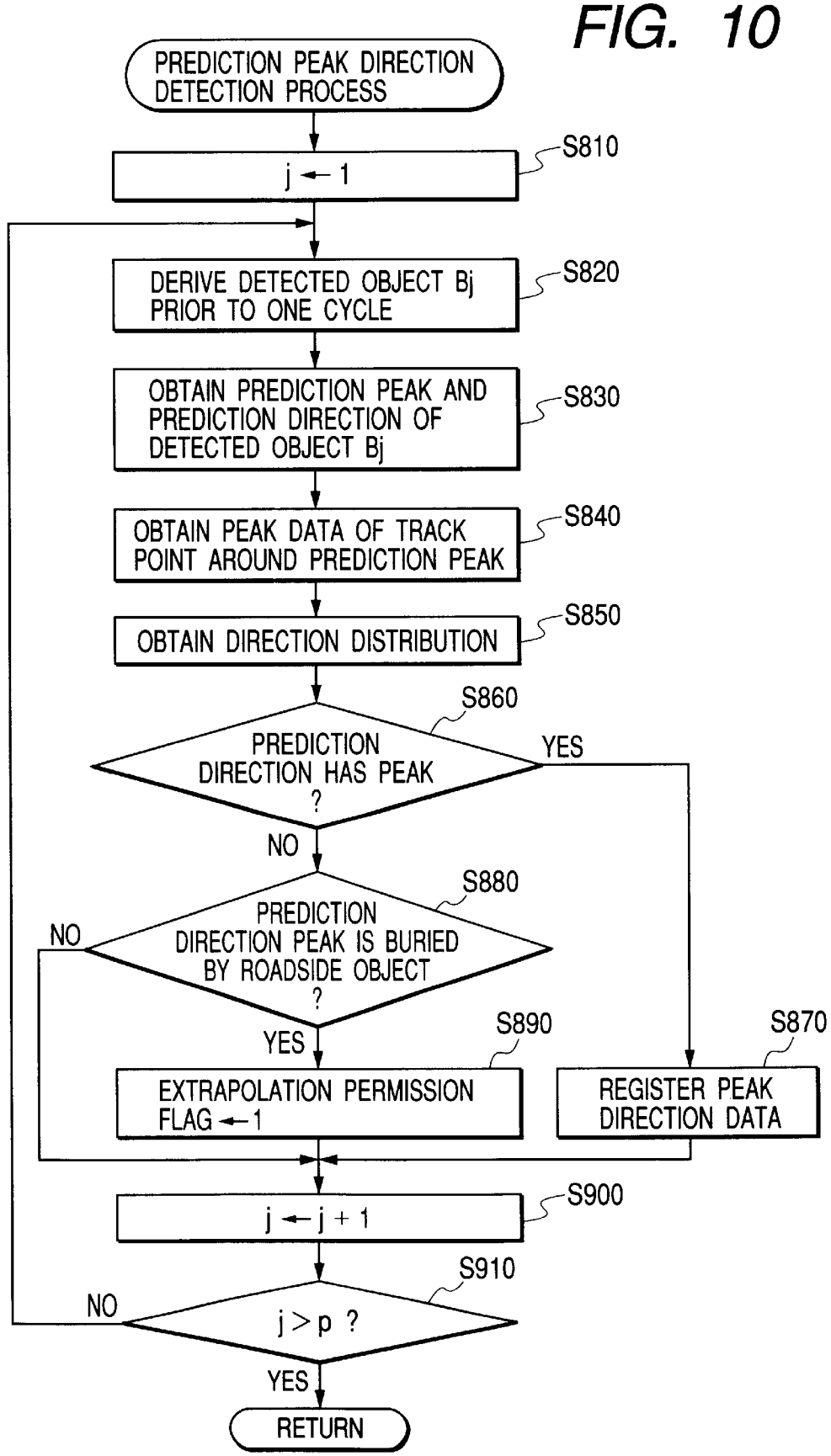
FIG. 10 is a flowchart of a direction detection process program for a prediction peak in accordance with one embodiment of the invention.

FIG. 10 is a flowchart of a direction detection process program for a prediction peak in accordance with one embodiment of the invention.

Based on the flowcharts in FIGS. 9 and 10, the calculation process of the peak direction that is executed at step 180 will be explained.

A direction detection process with respect to the predicted peaks registered peak data at step 210 is executed (step 710), followed by a step where a direction detection process in terms of the peaks actually detected at steps 230 and 240 is performed (step 710).

In the direction detection process of prediction peaks carried out in step 710, as shown in FIG. 10, a counter to show a value j for distinguishing the detected objects B1–Bp is preset to 1 (step 810). Information (a relative speed, a distance and a direction) concerning the detected objects Bj is derived (step 820). Based on the derived information, a prediction peak (frequency) and a prediction direction are obtained (step 830).

Out of the peak data registered at the peak detection process at step 170, for each modulation time, the peak data for the TRACK points around the prediction peak is obtained for all of the channels CH1–CHn (step 840). Applying the FFT to the obtained peak data produces a power spectrum in a direction (called a "directional power spectrum" hereinbelow) with respect to each modulation time and each frequency BIN (step 850).

Based on a directional distribution shown by the directional power spectrums for the TRACK points for each modulation time obtained in this way, it is judged whether or not the prediction direction obtained at step 830 has its peak (step 860). If the prediction direction has its peak, a direction to which the peak is detected is registered as peak direction data (step 870).

When, on the other hand, the prediction direction has no peak, it is judged whether or not there is a possibility that a peak of the prediction direction is buried by a peak based on roadside objects or a vehicle that runs in parallel (step 880). Only when there is the possibility, an extrapolation permission flag for the detected object Bj is set, and at the same time, the prediction direction is registered as peak direction data (step 890).

When at step 880 it is judged that there is no possibility that a peak of the prediction direction is buried, or at step 890 an extrapolation permission flag is set, or at step 870 a peak direction data is registered, the count value j is incremented (step 900). Then, it is judged whether or not the count value j is larger than a total number p of the detected objects (step 910). When the count value j is not larger than a total number p of the detected objects, the procedure return to step 820, from which the same process is carried out with respect to the unprocessed detected object Bj.

On the contrary, when the count value j is larger than a total number p of the detected objects, the present process ends as the process of obtaining a direction in terms of all of the detected objects B1–Bp.

Moreover, in the direction detection process in respect of the peak actually detected at step 720, as regards each of the peak data registered at steps 230 and 250, the directional power spectrum is secured by the FFT. Out of the directional power spectrum a peak is detected. Then, a direction corresponding to the peak is registered as peak direction data.

In this way, when peak direction data is obtained in respect of each peak, the calculation process of the peak direction (step 180) ends.

At the pair match process at step 190, based on the information concerning each peak obtained at steps 140 and 180, a peak pair is specified that shows the object such as a preceding vehicle.

Figure 11A:
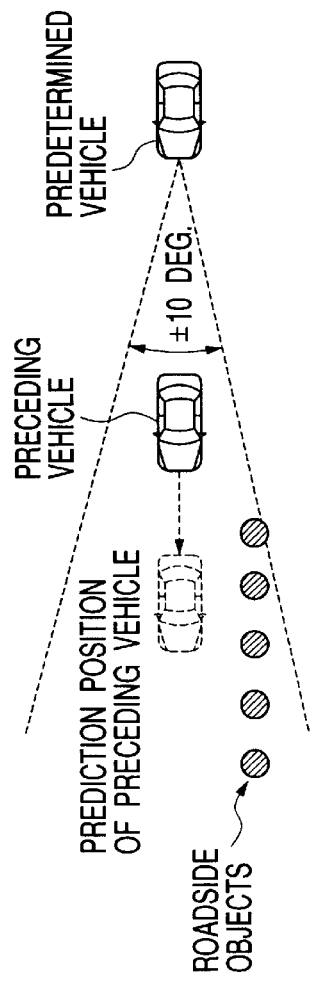
FIG. 11 is a diagram for illustrating an advantage of peak detection by the use of a prediction peak in accordance with one embodiment of the invention.
Figure 11C:
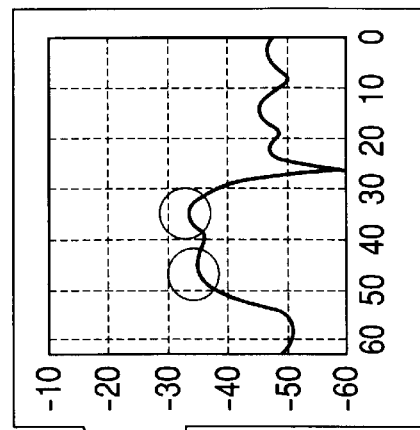
Figure 11B:
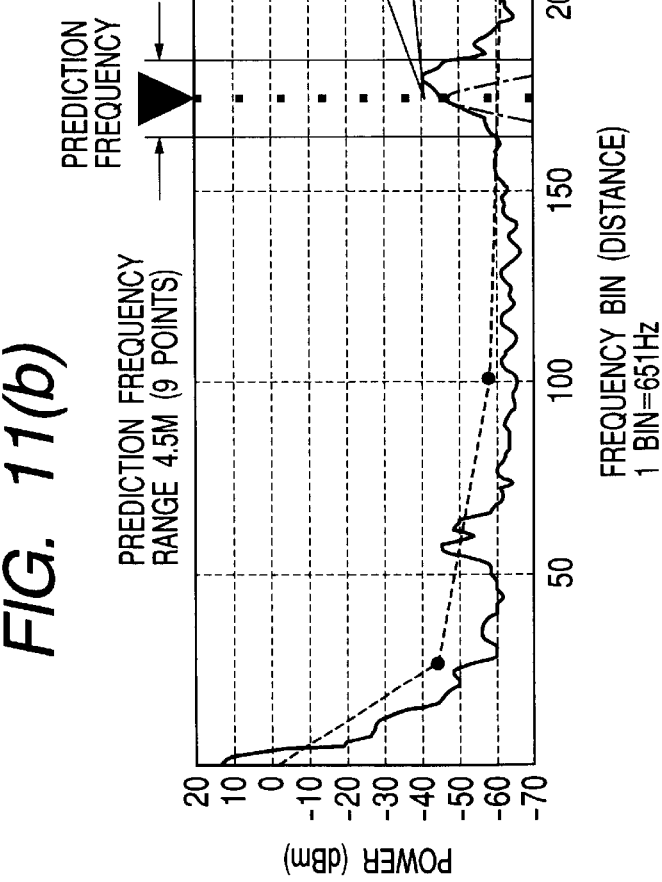

FIG. 11 is a diagram for illustrating an advantage of peak detection by the use of a prediction peak in accordance with one embodiment of the invention. FIG. 11(*a*) shows a predetermined vehicle with a beam angle of ±10 degrees and a preceding vehicle ahead of the predetermined vehicle. The preceding vehicle is recognized as a detected object by the predetermined vehicle. It is assumed that the preceding vehicle has entered an area where a roadside object such as a soundproof wall is provided. FIG. 11(*b*) is a diagram for a power spectrum obtained for FIG. 11(*a*) with respect to the frequency BIN (distance). The solid line shows a received power and the dotted line show a predetermined threshold for determining whether or not a detected peak should be extracted as a peak. As shown in FIG. 11(*b*), the peak of the distance power spectrum based on the preceding vehicle is buried by the peak based on the roadside objects.

However, as for the situation where the preceding vehicle has moved to a position shown in the dotted line in FIG. 11(a), the on-vehicle radar 2 in one embodiment in accordance with the invention displays a diagram in FIG. 11(c), where a power, calculated by the FFT, is shown with respect to a direction. The preceding vehicle and the roadside objects, which are in the different directions, can be differentiated for detection as the separate peaks on the direction power spectrum. This is because the on-vehicle radar 2 procures the direction power spectrum in respect of a range of the TRACK points around a frequency predicted from past information as regards the preceding vehicle. As a result, the preceding vehicle can be detected without fail.

Figure 12A:
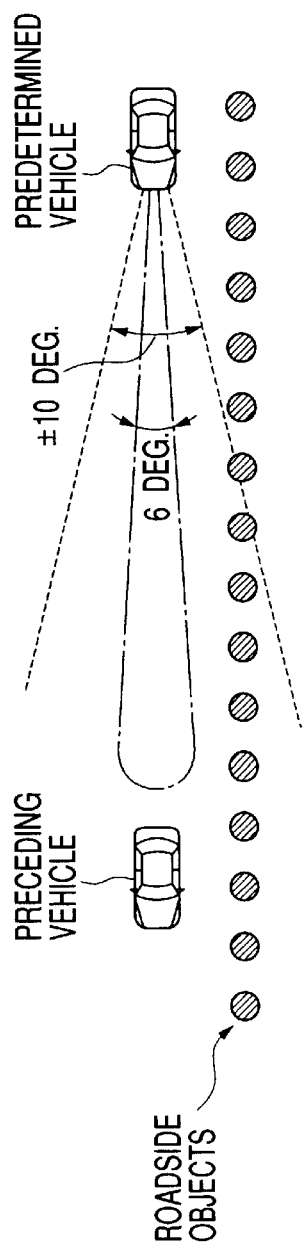
FIG. 12 is a diagram for illustrating an advantage of peak detection by the use of a peak detected from a power spectrum on a running line in accordance with one embodiment of the invention.
Figure 12B:
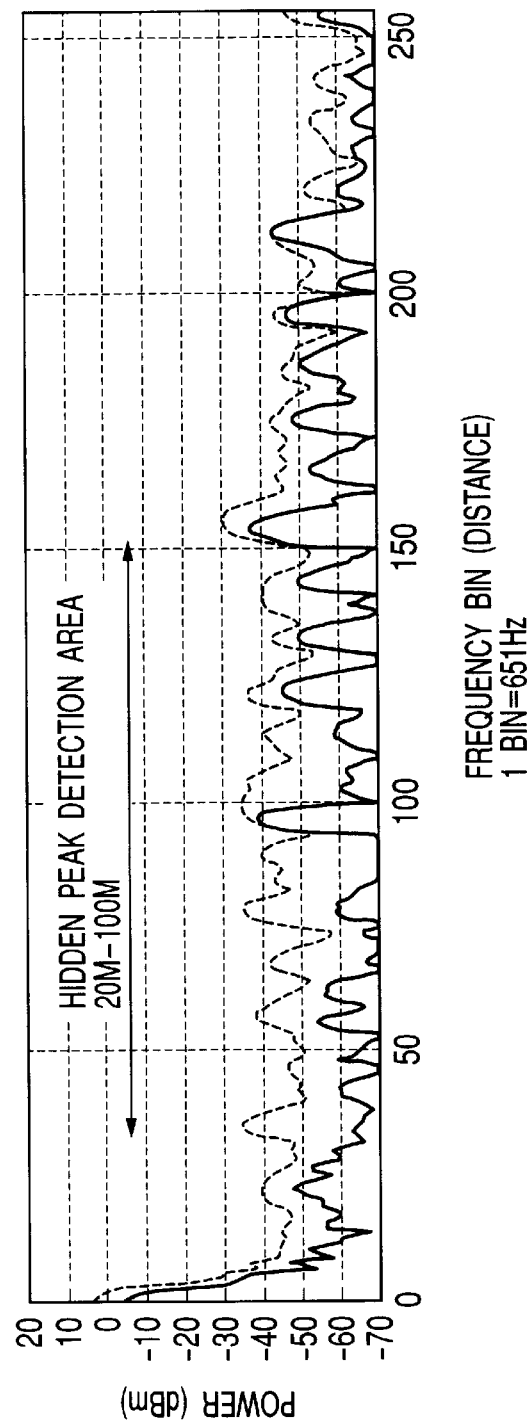

FIG. 12 is a diagram for illustrating an advantage of peak detection by the use of a peak detected from a power spectrum on a running line in accordance with one embodiment of the invention. FIG. 12(a) shows a situation where a predetermined vehicle runs on a straight road, with a preceding vehicle ahead and roadside objects on the left side. The roadside objects stretch out continuously.

This situation does not allow the detection by the use of the prediction peak shown in FIG. 11. However, the on-vehicle radar 2 in one embodiment in accordance with the invention gets a power spectrum on a running line, which corresponds to a detection using a narrow angle beam (6 degrees in one embodiment). Accordingly, as shown by the solid line in FIG. 12(b), a power spectrum without any influence by the reflection from the roadside objects can be obtained by the use of the DFT, which corresponds to a radiated beam angle of ±6 degrees. From a peak in the power spectrum, information on the preceding vehicle can be secured. The dotted line shows an average of the power spectrum on each of the channels CH1–CHn influenced by the reflection from the roadside objects, with respect to a radiated beam angle of ±10 degrees.

In one embodiment in accordance with the invention, the power spectrum on a running line is obtained only within the hidden peak detection range BL (corresponding to 20 m)–BH (corresponding to 100 m). This is because even if a beam angle is narrowed, in a far distance (over 100 m) the beam is supposed to contain a roadside, and in a near distance (below 20 m) a distance power spectrum is not influenced by the roadside objects and there is no need to get for the range. However, when a road is curved, a roadside may be contained within the beam angle even in a shorter distance. Therefore, the upper limitation value BH of the hidden peak detection range may be established so that it can be variable depending on a shape of a road.

As explained above, the on-vehicle radar 2 in one embodiment in accordance with the invention can reduce operation load for detecting objects, compared with a prior art apparatus seeking a direction power spectrum with respect to an entire region (all frequency BINs) of a distance power spectrum, because the on-vehicle radar 2 procures a direction power spectrum with respect to a point where an object is predicted to exist, that is, only with respect to the frequency BIN that corresponds to a peak detected in a distance power spectrum or a power spectrum on a running line, and the vicinity of the frequency BIN that corresponds to a prediction peak regarding the detected object Bj.

According to one embodiment in accordance with the invention, an object having a higher priority to be detected can be speedily detected, because an operation is executed in order of a prediction peak based on the detected object Bj, a peak detected in a power spectrum on a running line, and a peak detected in a distance power spectrum In addition, according to one embodiment in accordance with the invention, even when there is a hidden peak buried in other peaks on a distance power spectrum, the hidden peak cannot be missed, which guarantees a high detection capability, because not only a peak detected in the distance power spectrum but also a region for obtaining a direction power spectrum is established.

Moreover, according to one embodiment in accordance with the invention, even when a peak is missed temporarily, an object is judged to be lost immediately, which allows a stable detection result, because when there is a possibility that a prediction peak is buried in other peaks on a direction power spectrum, the peak is supposed to be extrapolated assuming that the peak is detected.

Although described above in connection with the particular embodiments of the invention, it should be understood that the descriptions of the embodiments are illustrative of the invention and are not intended to be limiting. Various modifications and applications may occur to those skilled in the art without departing from the true spirit and scope of the invention as defined in the appended claims.

For example, one embodiment in accordance with the invention provides one transmission antenna and a plurality of reception antennas. However, a plurality of transmission antenna and one reception antenna, or a plurality of transmission antennas and reception antennas can also be employed.

What is claimed is:

1. A signal process apparatus for an on-vehicle radar having a plurality of channels formed by a transmission antenna and a reception antenna array, and for processing a beat signal derived by mixing a transmission signal of a radar wave transmitted by the transmission antenna with a reception signal received by reception antenna array the through the channels, the signal process apparatus comprising:

a first operation unit for performing frequency analysis of the beat signal and obtaining a distance power spectrum for each of the channels;

a prediction point setting unit for setting a prediction point where an object is considered to be existent based on information other than peaks of the distance power spectrum; and a second operation unit for obtaining a direction power spectrum at the prediction point established by the prediction point setting unit based on a operation result of the first operation unit, whereby based on the operation result of the first and second operation units, information on the object that reflects the radar wave is obtained.

2. The apparatus as recited in claim 1, wherein the prediction point setting unit includes a running line estimator for estimating a running line that a predetermined vehicle is predicted to run, and a hidden peak extracting unit for obtaining a power spectrum along the running line that the running line estimator estimates and extracting a peak of the power spectrum, whereby a peak frequency that the hidden peak extracting unit extracts is set as the prediction point.

3. The apparatus as recited in claim 2, wherein the running line estimator estimates the running line based on at least one of outputs of a steering angle and a yaw rate sensor of the vehicle.

4. The apparatus as recited in claim 2, wherein the running line estimator estimates the running line based on a shape of a road in front of the vehicle specified by an arrangement of stationary objects that has already been detected.

5. The apparatus as recited in claim 2, wherein the running line estimator estimates the running line based on a shape of a road in front of the vehicle specified by map information and present position information on the vehicle provided from the outside.

6. The apparatus as recited in claim 2, wherein the hidden peak extracting unit obtains a power at each point on the running line by the use of the Discrete Fourier Transform.

7. The apparatus as recited in claim 1, wherein the prediction point setting unit includes a peak predicting unit for predicting peaks that the detected objects is supposed to produce on the distance power spectrum, based on information obtained during a previous detection cycle on the detected objects, wherein the peak predicting unit establishes as the prediction point each frequency in a predetermined frequency range that contains peak frequencies to be predicted.

8. The apparatus as recited in claim 7, further comprising an extracting unit for extracting a peak, supposing that the peak on the detected objects is detected, when there is a possibility that the peak about the detected objects is buried in another peak by other objects on a directional power spectrum that the second operation unit obtains, with respect to the prediction point that the peak predicting unit has established.

9. A method of processing a beat signal derived by mixing a transmission signal of a radar wave transmitted by a transmission antenna with a reception signal received by a reception antenna array through a plurality of channels in a signal process apparatus for an on-vehicle radar, the method comprising:

performing frequency analysis of the beat signal and obtaining a distance power spectrum for each of the channels;

setting a prediction point where an object is considered to be existent based on information other than peaks of the distance power spectrum; and obtaining a direction power spectrum at the prediction point established by the prediction point setting unit based on a operation result of the first operation unit, whereby based on the operation result of the first and second operation units, information on the object that reflects the radar wave is obtained.

10. A method of processing a beat signal derived by mixing a transmission signal of a radar wave with a reception signal from a detected object in a signal process apparatus for an on-vehicle radar having a plurality of channels, the method comprising:

registering as peak data a frequency BIN contained in a frequency region around a prediction peak that is to be detected on a distance power spectrum, from information on the object;

predicting a running line on which a predetermined vehicle runs to obtains a power spectrum along the running line;

registering as peak data a peak of the power spectrum;

obtaining a distance power spectrum for each channel;

averaging the distance power spectrum;

registering as peak data a peak of the averaged distance power spectrum; and seeking a directional power spectrum only with regard to the registered peak data.

* * * * *